(12) United States Patent
Jian (10) Patent No.: US 9,826,225 B2
(45) Date of Patent: Nov. 21, 2017

(54) 3D IMAGE DISPLAY METHOD AND HANDHELD TERMINAL

(71) Applicant: SuperD Co. Ltd., Shenzhen (CN)

(72) Inventor: Peiyun Jian, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 11 days.

(21) Appl. No.: 14/951,851

(22) Filed: Nov. 25, 2015

(65) Prior Publication Data

US 2016/0148551 A1    May 26, 2016

(30) Foreign Application Priority Data

Nov. 26, 2014   (CN) .......................... 2014 1 0696700

(51) Int. Cl.
*G09G 3/00*    (2006.01)
*H04N 13/04*   (2006.01)
*H04N 13/00*   (2006.01)

(52) U.S. Cl.
CPC ......... *H04N 13/0497* (2013.01); *G09G 3/003* (2013.01); *H04N 13/0022* (2013.01); *H04N 13/0402* (2013.01); *G09G 2340/0492* (2013.01); *G09G 2354/00* (2013.01)

(58) Field of Classification Search
CPC ............... H04N 19/88; H04N 13/0022; H04N 13/0454; H04N 21/440272; H04N 21/816; H04N 13/0007; H04N 13/0018; G09G 3/003; G09G 2340/0492; G09G 2354/00; G09G 2300/023; G09G 2300/0452; G09G 5/10; G09G 5/14; G09G 2300/0426; G09G 2310/0224; G09G 2320/0209; G09G 2320/0261; G09G 2320/0613; G09G 2320/068; G09G 2330/06; G06F 2200/1637; G06F 2200/1614; G06F 3/04815; G06F 3/0487; G06F 1/1626;
(Continued)

(56) References Cited

U.S. PATENT DOCUMENTS

2004/0150583 A1* 8/2004 Fukushima ........ H04N 13/0409
345/6
2011/0157156 A1   6/2011 Huang et al.
(Continued)

FOREIGN PATENT DOCUMENTS

CN    101030982 A    9/2007
CN    202160251 U    3/2012
(Continued)

*Primary Examiner* — Sultana M Zalalee
(74) *Attorney, Agent, or Firm* — Anova Law Group, PLLC (57) ABSTRACT

The present disclosure provides a 3D image display method for displaying 3D image on a handheld terminal display screen. The method includes the following steps. The handheld terminal detects a current screen display mode to determine whether the handheld terminal triggers a horizontal-vertical screen display mode change. The handheld terminal determines the current screen display mode as a horizontal mode or a vertical mode when the handheld terminal triggers a horizontal-vertical screen display mode change. The handheld terminal determines 3D image arrangement parameters based on the current screen display mode. The handheld terminal rearranges the 3D image to be displayed to obtain a revised 3D image based on the adjusted 3D image arrangement parameters. The handheld terminal displays the revised 3D image in the current screen display mode of the handheld terminal.

18 Claims, 6 Drawing Sheets

(58) Field of Classification Search
CPC .... G06F 1/1694; G06F 3/017; G06F 17/175;
G06F 1/1609; G06F 1/01; G06T 15/20;
G06T 2215/16; G06T 7/593; G06T 11/60;
G06T 19/00; G06T 3/4038; G06T 3/60;
G06T 3/606; G06T 15/005; G06T 15/06;
G06T 15/30; G06T 19/20; G06T 2200/04;
G06T 2207/10012; G06T 2207/20024;
G06T 2207/20182
See application file for complete search history.

(56) References Cited

U.S. PATENT DOCUMENTS

| | | | |
|---|---|---|---|
| 2013/0222558 A1* | 8/2013 | Yamada | H04N 13/04 348/59 |
| 2013/0241964 A1* | 9/2013 | Ohyama | G09G 3/003 345/690 |
| 2014/0036045 A1* | 2/2014 | Ishikawa | H04N 13/0409 348/51 |
| 2016/0198149 A1* | 7/2016 | Yuuki | H04N 13/0409 348/56 |

FOREIGN PATENT DOCUMENTS

| | | |
|---|---|---|
| CN | 103294358 A | 9/2013 |
| CN | 103472976 A | 12/2013 |
| JP | H08317429 A | 11/1996 |
| JP | 2004144792 A | 5/2004 |
| JP | 2006018282 A | 1/2006 |
| JP | 2010175643 A | 8/2010 |
| JP | 2014030103 A | 2/2014 |
| JP | 2014030259 A | 2/2014 |

\* cited by examiner a  b  c  d

3D IMAGE DISPLAY METHOD AND HANDHELD TERMINAL

CROSS-REFERENCES TO RELATED APPLICATIONS

This application claims the priority of Chinese Patent Application No. CN201410696700.9, filed on Nov. 26, 2014, the entire contents of which are incorporated herein by reference.

FIELD OF THE DISCLOSURE

The present disclosure generally relates to the field of 3D display technologies and, more particularly, relates to a 3D image display method and handheld terminal.

BACKGROUND

As the three-dimensional (3D) display technologies are making progresses, watching 3D videos on smart phones or tablet computers has become an important part of consumer entertainment. When users are watching 3D videos on smart phones or tablet computers, such handheld terminals often switch the screen display mode between a horizontal screen mode and a vertical screen mode. The screens of handheld terminals have different width over height ratios for the horizontal screen mode and the vertical screen mode. The display screens using the naked-eye 3D image display technologies include light splitting components. The light splitting components operate under different conditions and parameters for the horizontal screen mode and the vertical screen mode. When the screen display mode changes, it may be complicated to maintain the 3D image display, and rearrangement of the images displayed on the handheld terminal may be required to produce the 3D image suitable for viewing to achieve the desirable 3D viewing effect.

The disclosed 3D image display method and handheld terminal are directed to solve one or more problems set forth above and other problems in the art.

BRIEF SUMMARY OF THE DISCLOSURE

Directed to solve one or more problems set forth above and other problems in the art, the present disclosure provides a 3D image display method and a handheld terminal to improve viewing experience.

One aspect of the present disclosure includes a 3D image display method for displaying 3D image on a handheld terminal display screen. The method includes the following steps. The handheld terminal detects a current screen display mode to determine whether the handheld terminal triggers a horizontal-vertical screen display mode change. The handheld terminal determines the current screen display mode as a horizontal mode or a vertical mode when the handheld terminal triggers a horizontal-vertical screen display mode change. The handheld terminal determines 3D image arrangement parameters based on the current screen display mode. The handheld terminal rearranges the 3D image to be displayed to obtain a revised 3D image based on the adjusted 3D image arrangement parameters. The handheld terminal displays the revised 3D image in the current screen display mode of the handheld terminal.

Another aspect of the present disclosure provides a handheld terminal. The handheld terminal includes a screen change detection unit configured to detect a current screen display mode to determine whether the handheld terminal triggers a horizontal-vertical screen display mode change, a display mode determination unit configured to determine the current screen display mode as a horizontal mode or a vertical mode when the handheld terminal triggers a horizontal-vertical screen display mode change, an image arrangement parameter determination unit configured to determine 3D image arrangement parameters based on the current screen display mode, an image arrangement unit configured to rearrange the 3D image to be displayed to obtain a revised 3D image based on the adjusted 3D image arrangement parameters, and a display unit configured to display the revised 3D image in the current screen display mode of the handheld terminal.

Another aspect of the present disclosure provides a mobile handheld terminal. The mobile handheld terminal includes a display screen configured to display 3D image, a processor configured to execute instruction code, a memory configured to store executable instruction code, and a system bus configured to connect the display screen and the memory to the processor. The processor is configured to detect a current screen display mode to determine whether the handheld terminal triggers a horizontal-vertical screen display mode change, determine the current screen display mode as a horizontal mode or a vertical mode when the handheld terminal triggers a horizontal-vertical screen display mode change, determine 3D image arrangement parameters based on the current screen display mode, rearrange the 3D image to be displayed to obtain a revised 3D image based on the adjusted 3D image arrangement parameters, and display the revised 3D image in the current screen display mode of the handheld terminal.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the present invention.

Figure 1:
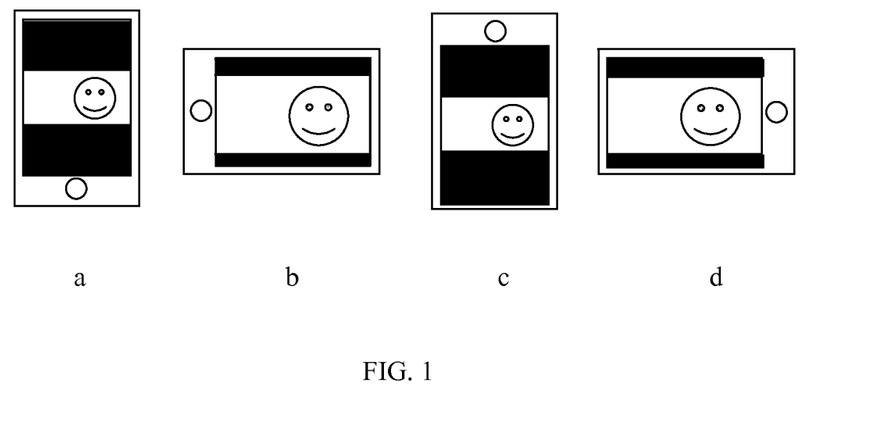
FIG. 1 illustrates schematic views of application scenes of the 3D image display method according to the disclosed embodiments.

A handheld terminal such as a tablet computer or a smart phone may display 3D images in a horizontal or a vertical screen display mode. In the horizontal screen display mode, a width of a display screen is larger than a height of a display screen. In the vertical screen display mode, the width of the display screen is smaller than the height of the display screen. A horizontal-vertical screen display mode change may refer to a change from the horizontal screen display mode to the vertical screen display mode or a change from the vertical screen display mode to the horizontal screen display mode. When a user views 3D images on a handheld terminal such as a tablet computer or a smart phone that supports a horizontal-vertical screen display mode change, the user may facilitate the horizontal-vertical screen display mode change by rotating the handheld terminal. FIG. 1 illustrates schematic views of application scenes of the 3D image display method according to the present disclosure. Each of FIGS. 1$a$-1$d$ illustrates an example of various display orientations.

More specifically, in FIG. 1($a$), the display screen is vertically oriented with the home button at the bottom; in FIG. 1($c$), the display screen is also vertically oriented but with the home button at the top; in FIG. 1($b$), the display screen is horizontally oriented with the home button on the left side; and in FIG. 1($d$), the display screen is horizontally oriented with the home button on the right side. The horizontal orientation may be called a landscape mode. The vertical orientation may be called a portrait mode. The landscape mode and the portrait mode are two screen display modes of the handheld terminal. The screen display modes may also be called the display modes.

When displaying two-dimensional (2D) images, the display rotation process running on the handheld terminal may first maintain the aspect ratio of the content page to be displayed, and may then align the content page for display from top to bottom and from left to right based on different display modes. When the aspect ratio for display is maintained, the display screen may be filled with the page content from top to bottom and from left to right.

Generally, 3D image display may include free form 3D image display that does not require 3D assisting devices, and non-free form 3D image display that requires wearing 3D glasses or other suitable assisting devices to view the 3D images. When the display mode changes, the display rotation process often needs to rearrange the 3D image content in addition to the actions described for the 2D image display. Thus, the display rotation process needs to acquire the parameters for the rearrangement algorithm based on the display mode change. The parameters for the rearrangement algorithm may be used to calculate the index values in the 3D image display. The index values may be used to determine the grayscale value and the sequence number in the left and right parallax view images for each sub-pixel.

Figure 2:
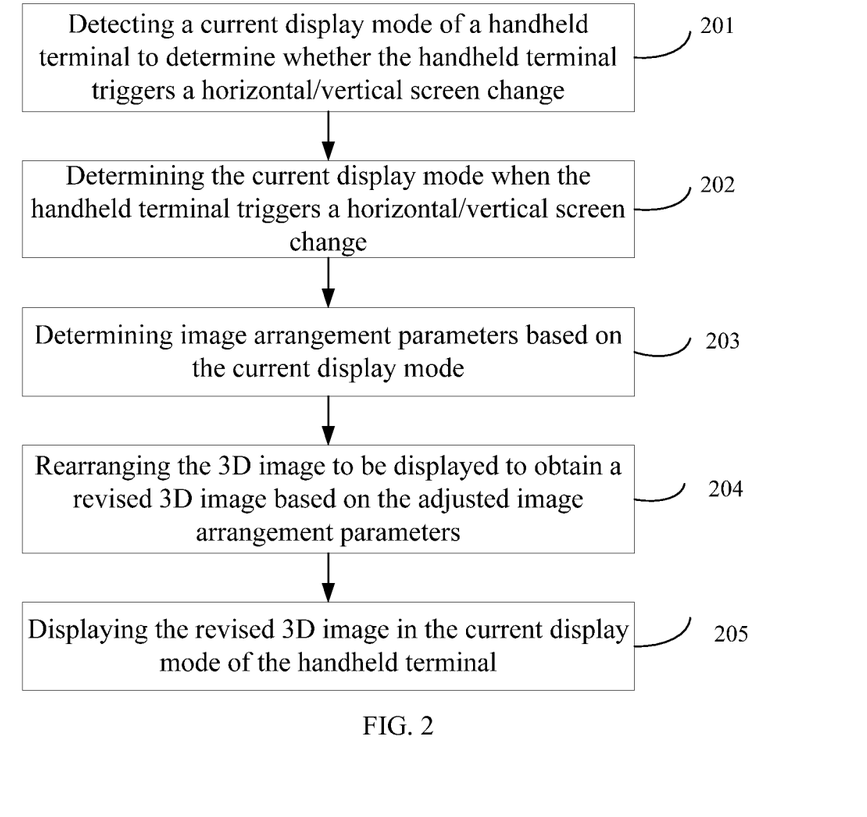
FIG. 2 illustrates a flow chart of an exemplary 3D image display method according to the disclosed embodiments.

Based on these application scenes, the present disclosure provides a 3D image display method. The method may be applied to handheld terminals, such as tablet computers and smart phones, capable of displaying 3D images. FIG. 2 illustrates a flow chart of an exemplary 3D image display method according to the present disclosure. Referring to FIG. 2, the 3D image display method may include the following steps.

Step 201: detecting a current screen display mode of a handheld terminal to determine whether the handheld terminal triggers a horizontal-vertical screen display mode change.

In this step, the handheld terminal may continuously check the rotation state of the handheld terminal and, accordingly, determine the screen display mode, which can be either the horizontal (or landscape) mode or the vertical (or portrait) mode. This step may run iteratively until the change of the screen display mode is detected. Then the process may proceed to the next step and further detect a next change of the screen display mode.

Step 202: determining the current screen display mode when the handheld terminal triggers the horizontal-vertical screen display mode change.

The screen display mode may include the horizontal (or landscape) mode and the vertical (or portrait) mode. The display rotation process may determine the current screen display mode after the change of the screen display mode is confirmed. That is, the current screen display mode is the display mode to which the handheld device switches, from a previous screen display mode. The subsequent steps may depend on the correct identification of the current screen display mode of the handheld terminal.

Various detection mechanisms, such as gravity sensors, may be used to detect the horizontal-vertical screen display mode change. In the various disclosed embodiments, the screen display mode may be the horizontal (or landscape) mode and the vertical (or portrait) mode. The change of the screen display mode often refers to the switching between the horizontal (or landscape) mode and the vertical (or portrait) mode.

Step 203: determining 3D image arrangement parameters based on the current screen display mode.

In one embodiment, the 3D image arrangement parameters may include, but are not limited to, RGB sub-pixel coordinates of each pixel, parallax between the left view image and the right view image, and the period and/or tilting angle of the light splitting component. The light splitting component may be a slit grating, a lenticular lens grating, or other suitable light splitter.

Step 204: rearranging the 3D image to be displayed to obtain a revised 3D image based on the 3D image arrangement parameters determined or adjusted for the current screen display mode.

Specifically, the handheld terminal may apply the 3D image arrangement parameters acquired from the step 203 to rearrange the 3D image for displaying in the current screen display mode. For example, the handheld terminal may apply the 3D image arrangement parameters to produce a new index table or revised index values to create a revised 3D image for displaying in the current screen display mode.

Step 205: displaying the revised 3D image in the current screen display mode of the handheld terminal.

In this step, the handheld terminal may display the revised 3D image produced in the step 204 on the display screen for the user to view. Because the revised 3D image is rearranged for the current screen display mode, the desirable display effect can be achieved.

Figure 3A:
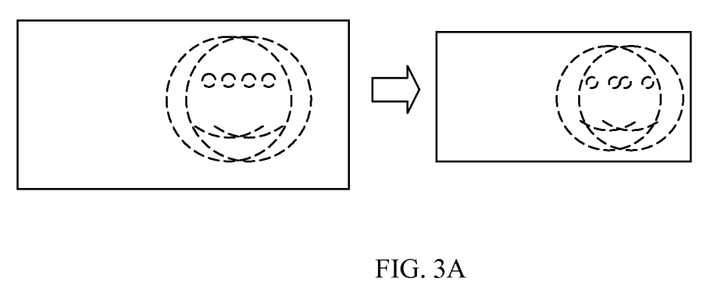
FIG. 3A illustrates a schematic view of a parallax adjustment of an exemplary 3D image display method according to the disclosed embodiments.
Figure 3B:
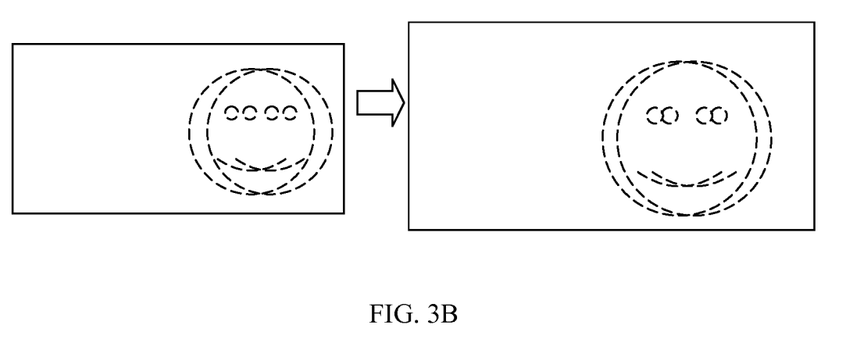
FIG. 3B illustrates a schematic view of another parallax adjustment of the exemplary 3D image display method according to the disclosed embodiments.

FIG. 3A illustrates a schematic view of a parallax adjustment of an exemplary 3D image display method according to the present disclosure. FIG. 3B illustrates a schematic view of another parallax adjustment of the exemplary 3D image display method according to the present disclosure. Referring to FIGS. 3A and 3B, in one embodiment, under a naked-eye 3D display solution, i.e., an autostereoscopic display, the view images may shrink or enlarge when the screen display mode changes.

For the autostereoscopic 3D display, the image shrinkage may reduce the 3D effectiveness because the shrunk image feels less protruded or indented. On the other hand, the larger the image size, the more protruded or indented. When the image size changes, a parallax compensation may be required in addition to the display rotation processing for the screen display mode change. In one embodiment, when the screen display mode changes, the parallax compensation may be applied to the display image to reduce the sudden change of the 3D effectiveness due to the image shrinkage or enlargement in response to the display screen mode change.

In other words, after confirming the handheld terminal switches the screen display mode, determining the 3D image arrangement parameters based on the current screen display mode may further include the parallax compensation process for the 3D image to be displayed.

Specifically, when the size of the 3D image to be displayed is smaller than the size of the 3D image displayed in the horizontal (or landscape) mode, the handheld terminal may increase the parallax of the 3D image to be displayed, as shown in FIG. 3B. When the size of the 3D image to be displayed is larger than the size of the 3D image displayed in the vertical (or portrait) mode, the handheld terminal may reduce the parallax of the 3D image to be displayed, as shown in FIG. 3A.

In one embodiment, the parallax compensation method may depend on two sizes, the original size of the 3D image displayed and the display size on the handheld terminal. For example, the original size of the 3D image refers to the size of the original source image displayed before display mode switch. The display size refers to the size of the 3D image displayed on the handheld terminal screen after the display mode switch. The original size and the display size of the 3D image may be used to compensate the parallax of the 3D image to be displayed.

There are a variety of parallax compensation methods, such as scene reconstruction or horizontal movement. In one embodiment, the horizontal movement is used for illustrative purposes. The parallax adjustment is given in terms of the original size and the display size in equation (1) below, $$\Delta = f\left(1 - \frac{S_{dis}}{S_{ori}}\right) S_{ori} \quad (1)$$

wherein, $S_{ori}$ is the original size, $S_{dis}$ is the display size, and $f(\ )$ is a polynomial function.

Because the parallax adjustment does not have a linear relationship with the original size and the display size, a polynomial function may be used to calculate the desirable parallax adjustment. Generally, the polynomial function is given as equation (2) below, $$f(x) = ax^{-2} + bx^{-1} + cx + dx^2 + e \quad (2)$$

wherein, the coefficients of the polynomial function are determined according to the optical properties of various 3D display devices.

In certain embodiments, the parallax adjustment may be used to compensate the parallax impairment due to the screen display mode change. The parallax may be adjusted based on the display size and the original size of the 3D image to be displayed.

Figure 4A:
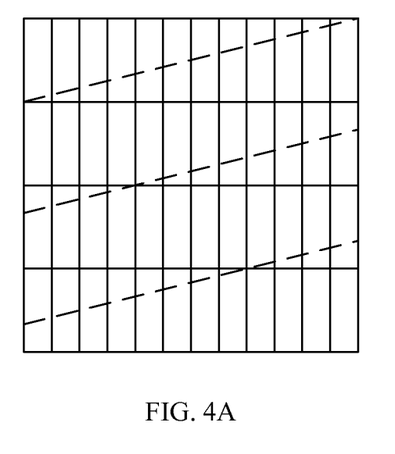
FIG. 4A illustrates a schematic view of an exemplary light splitting component operating state according to the disclosed embodiments.
Figure 4B:
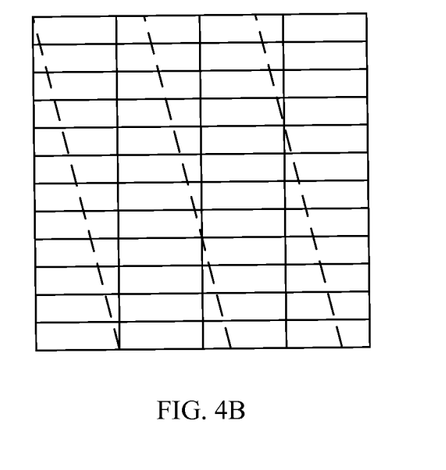
FIG. 4B illustrates a schematic view of another exemplary light splitting component operating state according to the disclosed embodiments.

FIG. 4A illustrates a schematic view of an exemplary light splitting component operating state according to the present disclosure. FIG. 4B illustrates a schematic view of another exemplary light splitting component operating state according to the present disclosure. Referring to FIG. 4A, the light splitting component may operate in a state when the current screen display mode is in the vertical mode. Referring to FIG. 4B, the light splitting component may operate in a state when the current screen display mode is in the horizontal mode. The state of the light splitting component may be related to the sub-pixel alignment. Each pixel may include a plurality of sub-pixels. For example, each pixel may have three sub-pixels. In certain embodiments, the three sub-pixels may be the RGB components of a pixel.

Figure 5A:
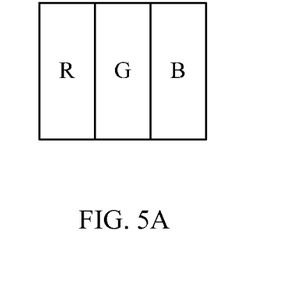
FIG. 5A illustrates a schematic view of a sub-pixel alignment in the vertical mode according to the disclosed embodiments.
Figure 5B:
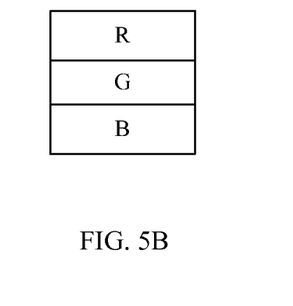
FIG. 5B illustrates a schematic view of a sub-pixel alignment in the horizontal mode according to the disclosed embodiments.

FIG. 5A illustrates a schematic view of a sub-pixel alignment in the vertical mode according to the present disclosure. FIG. 5B illustrates a schematic view of a sub-pixel alignment in the horizontal mode according to the present disclosure.

As shown in FIG. 5A, the three sub-pixels are often aligned in the horizontal direction when the display screen is in the vertical (or portrait) mode. As shown in FIG. 5B, the three sub-pixels are often aligned in the vertical direction when the display screen is in the horizontal (or landscape) mode. Specifically, the three sub-pixels may have other different alignments, such as RGB, GRB, or GRB, etc. Generally, the three sub-pixels may be in RGB alignment sequence. The alignment sequence may refer to the order of the alignment of the RGB sub-pixels. The RGB sub-pixel alignment may change in different application scenes. The sub-pixel alignment may change in different display panel designs by different vendors. As shown in FIG. 1, the sub-pixel alignment may change when the viewer changes the viewing perspective or display mode. The display panel design and the display device orientation may have a variety of combinations. However, the three sub-pixels may only be in one of the two alignments as shown in FIGS. 5A-5B.

The sub-pixel alignment may affect the tilting angle and the period of the light splitting component in the re-arrangement algorithm. The light splitting component may be a grating, such as a slit grating or a lenticular grating. Using the grating for illustration purpose, the dash lines in FIGS. 4A-4B indicate the tilting angle of the grating and the intervals between the dash lines indicate the period of the grating. The grating may be fastened to the display panel.

When the screen display mode changes, the display effect shown in FIG. 4B may appear from the viewer's perspective. Assuming the display mode in FIG. 4B is the default display mode, the handheld terminal may store a set of optical parameters by design for the light splitting component, including the tilting angle θ and grating period or pitch.

When the default display mode shown in FIG. 4B changes to the display mode shown in FIG. 4A, the set of the optical parameters may change as given in equations below, $$\theta'=\theta-90°,$$

$$pitch'=pitch\,\tan\theta.$$

In the rearrangement process or algorithm of the handheld terminal, the revised set of optical parameters (θ', pitch') may be used to calculate the position relationship between the index value and the dash lines, sub-pixel by sub-pixel.

In other words, in one embodiment, the handheld terminal may determine the current period of the light splitting component in the current screen display mode based on the period of the prior screen display mode, and the rotating angle during the screen display mode change. Moreover, the handheld terminal may determine the current tilting angle of the light splitting component in the current screen display mode based on the tilting angle of the prior screen display mode, and the rotating angle during the screen display mode change.

In one embodiment, through detecting the display mode change, the handheld terminal may determine the sub-pixel alignment and use the revised optical parameters of the light splitting component after the display mode change as the input parameters to rearrange the image to be displayed.

In another embodiment, after the display mode change, the re-arrangment algorithm may use the sub-pixel coordinates of each pixel to calculate the index value and the grayscale of each sub-pixel. In the re-arrangment algorithm, the pixel coordinates often correlate with the current screen display mode. The top left corner of the screen image may be defined as the origin. The coordinates of the pixels and sub-pixels may increment from left to right and from top to bottom. The coordinates of each set of RGB sub-pixels may correlate with the current screen display mode and the sub-pixel alignment. The display mode may determine the current sub-pixel alignment direction and the sub-pixel alignment sequence that in turn determine the coordinate of each sub-pixel under different sub-pixel alignment sequences.

The 3D image arrangement parameters may include pixel information. Each pixel may include a plurality of sub-pixels, for example, RGB three sub-pixels. The pixel information may include sub-pixel coordinates. A pixel coordinate may be a fixed pixel coordinate or a logical pixel coordinate. The fixed pixel coordinate may be a coordinate in the horizontal and the vertical direction on the display screen. The logical pixel coordinate may be a pixel coordinate relative to other pixels. The logical pixel coordinate may be subject to rescaling to adjust to the current screen display mode. The current screen display mode may be used to determine the 3D image arrangement parameters. Further, based on the current screen display mode, the image arrangement may include converting the fixed pixel coordinates to the logical pixel coordinates corresponding to the current screen display mode and calculating the coordinates of each sub-pixel based on the logical pixel coordinate.

Further, the logical pixel coordinate and the sub-pixel alignment direction may be used to determine the coordinate of each sub-pixel under the current sub-pixel alignment sequence.

Specifically, in the vertical (or portrait) mode, sub-pixels of each pixel may be aligned in the horizontal direction. The coordinate of the first sub-pixel in the pixel may be defined as the x-axis value of the logical pixel coordinate minus one third of the pixel pitch. The coordinate of the second sub-pixel in the pixel may be defined as the x-axis value of the logical pixel coordinate. The coordinate of the third sub-pixel in the pixel may be defined as the x-axis value of the logical pixel coordinate plus one third of the pixel pitch.

In the horizontal (or landscape) mode, sub-pixels of each pixel may be aligned in the vertical direction. The coordinate of the first sub-pixel in the pixel may be defined as the y-axis value of the logical pixel coordinate plus one third of the pixel pitch. The coordinate of the second sub-pixel in the pixel may be defined as the y-axis value of the logical pixel coordinate. The coordinate of the third sub-pixel in the pixel may be defined as the y-axis value of the logical pixel coordinate minus one third of the pixel pitch.

The sub-pixel alignment sequences shown in FIGS. 5A-5B may be used for illustration purpose. Assuming the pixel coordinate in the current screen display mode is (u, v) and the sub-pixel alignment sequence is RGB, the coordinates for the R, G and B three components in FIG. 5A may be given in equation below, $$\begin{bmatrix} u-1/3 & v \\ u & v \\ u+1/3 & v \end{bmatrix} = \begin{bmatrix} R \\ G \\ B \end{bmatrix}.$$

Similarly, the coordinates for the R, G and B three components in FIG. 5B may be given in equation below, $$\begin{bmatrix} u-1/3 & v \\ u & v \\ u+1/3 & v \end{bmatrix} = \begin{bmatrix} R \\ G \\ B \end{bmatrix}.$$

Figure 6:
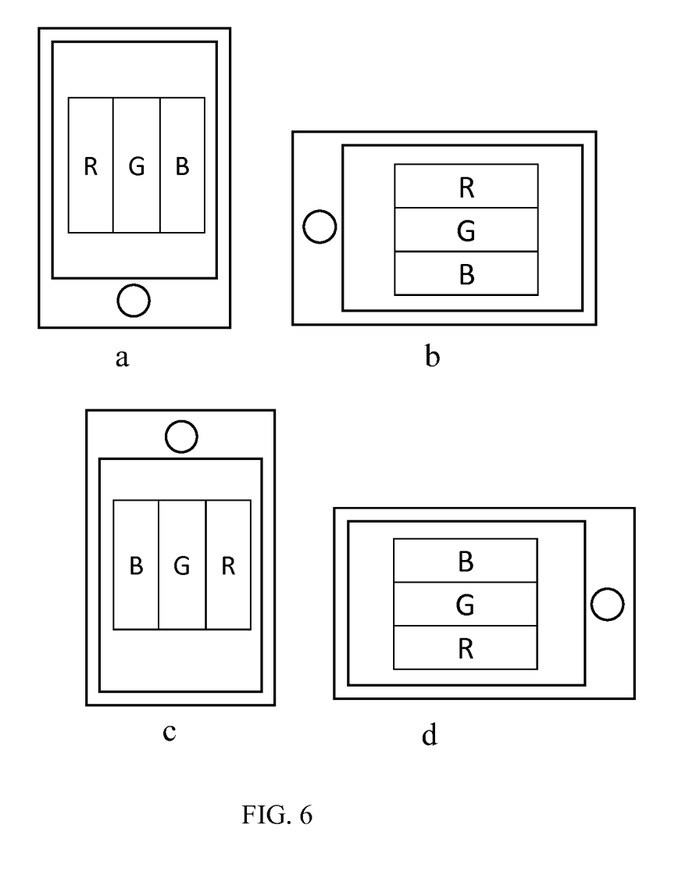
FIG. 6 illustrates schematic views of various sub-pixel alignments according to the disclosed embodiments.

In real life applications, display panel configurations by different handheld terminal vendors may include different RGB sub-pixel alignment sequence, such as RGB, RBG, GBR, GRB, BRG, and BGR. FIG. 6 illustrates schematic views of various sub-pixel alignments according to the present disclosure. Four sub-pixel alignments with different directions (vertical and horizontal) and sequences (RGB and BGR) are shown in FIGS. 6a-6d.

As shown in FIGS. 6a-6d, the coordinates corresponding to the R, G, and B components may be given in equations below.

$$\begin{bmatrix} u-1/3 & v \\ u & v \\ u+1/3 & v \end{bmatrix}$$

are the coordinates corresponding to the R, G, and B components in FIG. 6a.

$$\begin{bmatrix} u & v-1/3 \\ u & v \\ u & v+1/3 \end{bmatrix}$$

are the coordinates corresponding to the R, G, and B components in FIG. 6b.

$$\begin{bmatrix} u+1/3 & v \\ u & v \\ u-1/3 & v \end{bmatrix}$$

are the coordinates corresponding to the R, G, and B components in FIG. 6c.

$$\begin{bmatrix} u & v+1/3 \\ u & v \\ u & v-1/3 \end{bmatrix}$$

are the coordinates corresponding to the R, G, and B components in FIG. 6d.

Similarly, the coordinates corresponding to the R, G, and B components in each sub-pixel alignment with different directions and sequences may be derived to calculate the index values and to use the index values to determine the RGB grayscales in the re-arrangment algorithm.

In certain embodiments, the handheld terminal may switch between the horizontal (or landscape) mode and the vertical (or portrait) mode. The handheld terminal may use the direction and the sequence of the sub-pixel alignment to determine the 3D image arrangement parameters to achieve the display effect desirable for each screen display mode.

Figure 7:
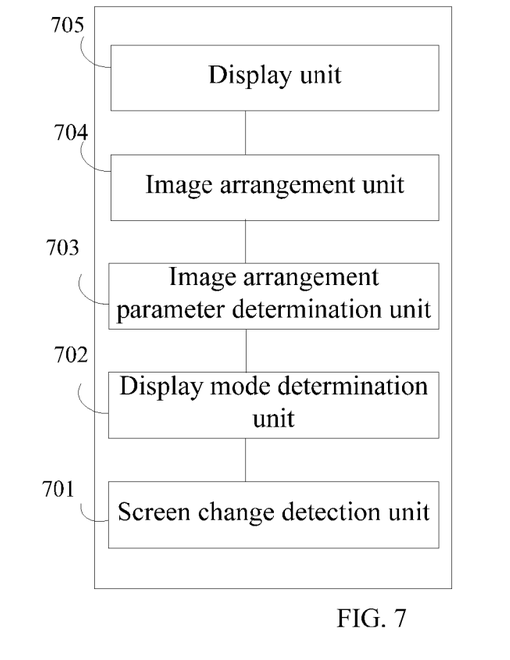
FIG. 7 illustrates a schematic view of the structure of an exemplary handheld terminal according to the disclosed embodiments.

Accordingly, FIG. 7 illustrates a schematic view of the structure of an exemplary handheld terminal according to the present disclosure. In certain embodiments, the handheld terminal may include, but is not limited to, a tablet computer, a smart phone, and other electronic device capable of 3D image display. As shown in FIG. 7, the handheld terminal may include a screen change detection unit 701, a display mode determination unit 702, an image arrangement parameter determination unit 703, an image arrangement unit 704, and a display unit 705.

The screen change detection unit 701 may detect a current screen display mode of a handheld terminal to determine whether the handheld terminal triggers a horizontal-vertical screen display mode change.

The display mode determination unit 702 may determine the current screen display mode as the horizontal (or landscape) mode or the vertical (or portrait) mode when the handheld terminal triggers the horizontal-vertical screen display mode change.

The image arrangement parameter determination unit 703 may determine 3D image arrangement parameters based on the current screen display mode.

The image arrangement unit 704 may rearrange the 3D image to be displayed to obtain a revised 3D image based on the adjusted 3D image arrangement parameters.

The display unit 705 may display the revised 3D image in the current screen display mode of the handheld terminal.

In one embodiment, the 3D image display method shown in FIG. 2 may be implemented in the handheld terminal shown in FIG. 7. Each function unit may operate as described in the 3D image display method shown in FIG. 2.

In certain embodiments, the handheld terminal may detect the horizontal-vertical screen display mode change. Based on the horizontal-vertical screen display mode change, the handheld terminal may determine the 3D image arrangement parameters corresponding to the changed screen display mode and may rearrange the 3D image to be displayed. The revised 3D image may be displayed on the display screen in the current screen display mode to achieve the 3D display effect desirable for the current screen display mode. Thus, the 3D display effect for 3D viewing can be improved.

Figure 8:
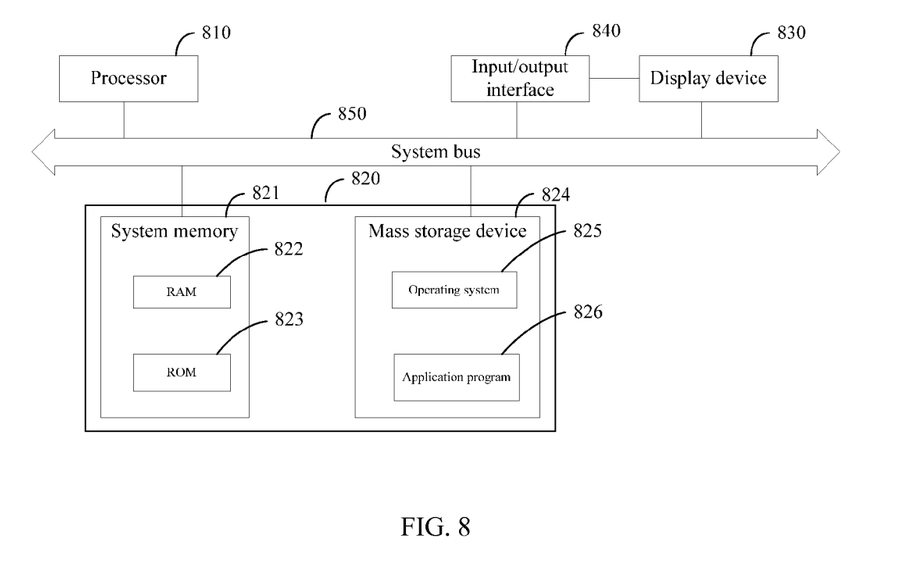
FIG. 8 illustrates a schematic view of the structure of another exemplary handheld terminal according to the disclosed embodiments.

Accordingly, FIG. 8 illustrates a schematic view of the structure of another exemplary handheld terminal according to the present disclosure. The handheld terminal may be a smart phone, a tablet computer, or other electronic device that supports the naked-eye 3D display function. In the following descriptions, the handheld terminal may sometimes be referred to as the computer. As shown in FIG. 8, the handheld terminal may include a processor 810, a memory 820, a display device 830, and a system bus 850 that connects the screen change detector (not shown), the memory 820, and the display device 830 to the processor 810.

In certain embodiments, the handheld terminal may include different peripheral devices based on different 3D display methods. For example, the handheld terminal may include an infrared sensor or an image acquisition device to track the viewer's position in the naked-eye 3D display configuration.

Figure 9:
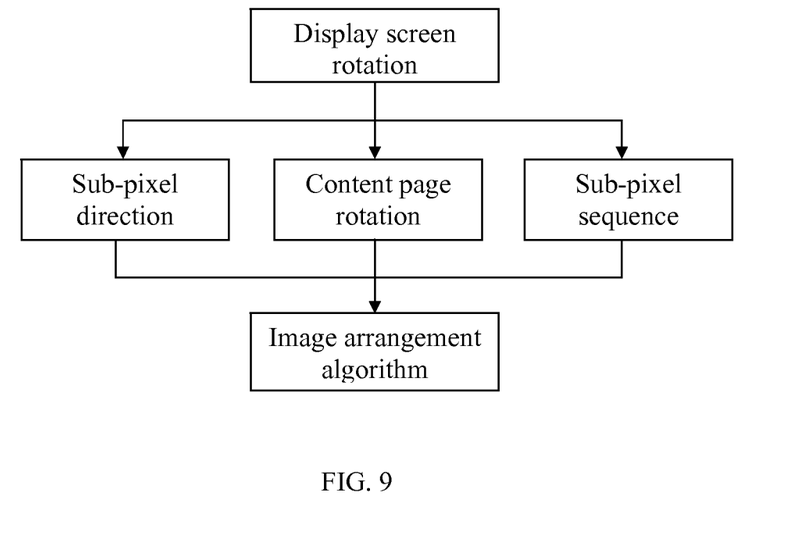
FIG. 9 illustrates a flow chart of another exemplary 3D image display method according to the disclosed embodiments.

FIG. 9 illustrates an exemplary 3D image display process consistent with the above disclosed embodiments. Referring to FIG. 9, when the handheld terminal triggers a horizontal-vertical screen display mode change due to the rotation (i.e., display screen rotation), the handheld terminal may apply various image processing algorithms in parallel and in series. For example, the handheld terminal may apply a sub-pixel direction algorithm to determine, rearrange, and/or adjust sub-pixel direction of the to-be-rotated image, may apply a content page rotation algorithm to render the to-be-rotated image, and may also apply a sub-pixel sequence algorithm to determine, rearrange, and/or adjust sub-pixel sequence. Further, the handheld terminal may apply a re-arrangment algorithm to the pixel information of the 3D image displayed on the display screen to obtain the 3D image to be displayed in the current screen display mode. The pixel information of the 3D image may include the previously obtained content page image for rotation, sub-pixel direction, and sub-pixel sequence.

Referring to FIG. 8, the system memory 821 and the mass storage device 824 may be combined to form the memory 820 of the handheld terminal. The system memory 821 may further include a read only memory (ROM) 823 and a random access memory (RAM) 822. The basic input/output system may be stored in the ROM 823. The mass storage device 824 may be used to store the operating system, software programs, data, and various program modules, such as program modules for the application software.

The mass storage device 824 may be connected to the processor 810 through a mass storage controller (not shown) connected to the system bus 850. The mass storage device 824 and the related computer readable media may provide the non-volatile storage for the computer.

Although the description for the computer readable media includes hard drive, CD-ROM drive, or other mass storage device, those skilled in the art should understand that the computer readable media may include any computer storage media that can be accessed by a computer.

For illustration purpose, the computer readable media may include any volatile or non-volatile, movable or non-movable media that can store the information and data such as computer accessible instructions, data structures, and program modules. For example, the computer accessible media may include, but are not limited to, RAM, ROM, EPROM, EEPROM, flash memory, other solid state memory, CD-ROM, DVD, HD-DVD, blue ray, other optical storage device, cassette, tape, magnetic disk, other magnetic storage device, or any other media that store information and are computer accessible.

The computer may connect to the network through a network interface (not shown) connected to the system bus. The computer may include an input/output controller (not shown) that receives and processes input data from a keyboard, a mouse, a stylus, or other suitable device. Similarly, the input/output controller may provide output data to a display device, a printer, or other suitable output device. The display device may be connected to the system bus through a graphics adapter or a graphics processing unit.

Accordingly, multiple program modules and data files including the operating system that controls the display device may be stored in the mass storage device and RAM of the computer. One or more program modules may be stored in the mass storage device, ROM, and RAM. Specifically, the mass storage device, ROM, and RAM may store application programs executed by the processor.

The memory may store a set of program code. The processor may retrieve the set of program code stored in the memory to perform the following operations. The processor detects the current screen display mode of the handheld terminal to determine whether the handheld terminal triggers the horizontal-vertical screen display mode change. After confirming the horizontal-vertical screen display mode change of the handheld terminal, the processor determines the current screen display mode as the horizontal (or landscape) mode or vertical (or portrait) mode. The processor determines the 3D image arrangement parameters based on the current screen display mode. The processor rearranges the 3D image to be displayed to obtain the revised 3D image based on the adjusted 3D image arrangement parameters. The processor displays the revised 3D image on the display screen in the current screen display mode of the handheld terminal.

In certain embodiments, the handheld terminal may detect the horizontal-vertical screen display mode change. Based on the detected horizontal-vertical screen display mode, the handheld terminal may determine the 3D image arrangement parameters corresponding to the changed screen display mode. The handheld terminal may rearrange the 3D image to be displayed to obtain the revised 3D image and may display the revised 3D image on the display screen in the current screen display mode to achieve the 3D display effect desirable for the current screen display mode. Thus, the 3D display effect for 3D viewing is improved.

Further, the function units of the handheld terminal and the steps of the 3D image display method according to the present disclosure may be implemented by electronic hardware, computer software or a combination of electronic hardware and computer software. To clearly illustrate this interchangeability of hardware and software, the present disclosure provides the general functional descriptions for individual unit and step of the various disclosed embodiments. These functions may be implemented in hardware or software depending on the specific application and design constraints. Those who skilled in the art may use different methods to implement these functions without departing from the scope of the present disclosure.

The methods and algorithms according to the present disclosure may be implemented in hardware, software or a combination of hardware and software. The software modules may be stored in RAM, memory, ROM, EPROM, EEPROM, registers, hard drive, movable drive, CD-ROM, or any other storage media known in the technical field.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. A 3D image display method for a handheld terminal, comprising:
    detecting a current screen display mode to determine whether the handheld terminal triggers a horizontal-vertical screen display mode change;
    determining the current screen display mode as a horizontal mode or a vertical mode when the handheld terminal triggers a horizontal-vertical screen display mode change;
    determining 3D image arrangement parameters based on the current screen display mode, wherein: the 3D image arrangement parameters include pixel information having coordinates of a plurality of sub-pixels of a pixel; and determining the 3D image arrangement parameters includes: converting a fixed pixel coordinate to a logical pixel coordinate corresponding to the current screen display mode; and calculating the coordinate for each sub-pixel based on the logical pixel coordinate;
    rearranging the 3D image to be displayed to obtain a revised 3D image based on the adjusted 3D image arrangement parameters; and
    displaying the revised 3D image in the current screen display mode of the handheld terminal.

2. The 3D image display method of claim 1, wherein: the 3D image arrangement parameters further include a tilting angle and a period of a light splitting component coupled to a display screen of the handheld terminal for effecting 3D display; and
    determining the 3D image arrangement parameters based on the current screen display mode includes: determining a current tilting angle of the light splitting component based on the tilting angle of the light splitting component prior to the horizontal-vertical screen display mode change and a rotation angle of the horizontal-vertical screen display mode change; and determining a current period of the light splitting component based on the period of the light splitting component prior to the horizontal-vertical screen display mode change and the rotation angle of the horizontal-vertical screen display mode change.

3. The 3D image display method of claim 1, wherein: the 3D image arrangement parameters further include a direction and a sequence of the sub-pixel alignment in each pixel; and calculating the coordinate of each sub-pixel includes determining the coordinate of each sub-pixel in the current sub-pixel alignment based on the logical pixel coordinate and the direction of the sub-pixel alignment.

4. The 3D image display method of claim 3, further including:
    aligning three sub-pixels of each pixel in the horizontal direction when the current screen display mode is the vertical mode;
    assigning the coordinate of the first sub-pixel in the pixel as the x-axis value of the logical pixel coordinate minus one third of the pixel pitch;
    assigning the coordinate of the second sub-pixel in the pixel as the x-axis value of the logical pixel coordinate; and
    assigning the coordinate of the third sub-pixel in the pixel as the x-axis value of the logical pixel coordinate plus one third of the pixel pitch.

5. The 3D image display method of claim 3, further including:
aligning three sub-pixels of each pixel in the vertical direction when the current screen display mode is the horizontal mode;
assigning the coordinate of the first sub-pixel in the pixel as the y-axis value of the logical pixel coordinate plus one third of the pixel pitch;
assigning the coordinate of the second sub-pixel in the pixel as the y-axis value of the logical pixel coordinate; and
assigning the coordinate of the third sub-pixel in the pixel as the y-axis value of the logical pixel coordinate minus one third of the pixel pitch.

6. The 3D image display method of claim 1, further including:
when the handheld terminal triggers the horizontal-vertical screen display mode change, applying parallax compensation to the 3D image to be displayed.

7. The 3D image display method of claim 6, further including:
enlarging the parallax of the 3D image to be displayed when the original size of the 3D image to be displayed is smaller than the display size on the handheld terminal in the horizontal mode.

8. The 3D image display method of claim 6, further including:
shrinking the parallax of the 3D image to be displayed when the original size of the 3D image to be displayed is larger than the display size on the handheld terminal in the vertical mode.

9. The 3D image display method of claim 6, wherein:
an adjustment of the parallax compensation is derived from equation $$\Delta = f\left(1 - \frac{S_{dis}}{S_{ori}}\right) S_{ori},$$

wherein, $S_{ori}$ is an original size of the 3D image, $S_{dis}$ is a display size of the 3D image, and f( ) is a polynomial function; and
the polynomial function is $(x)=ax^{-2}+bx^{-1}+cx+dx^2+e$, wherein, the coefficients a, b, c, d, and e are empirical values.

10. A handheld terminal, comprising:
a screen change detection unit configured to detect a current screen display mode to determine whether the handheld terminal triggers a horizontal-vertical screen display mode change;
a display mode determination unit configured to determine the current screen display mode as a horizontal mode or a vertical mode when the handheld terminal triggers a horizontal-vertical screen display mode change;
an image arrangement parameter determination unit configured to determine 3D image arrangement parameters based on the current screen display mode, wherein:
the 3D image arrangement parameters include pixel information having coordinates of a plurality of sub-pixels of a pixel; and
determining the 3D image arrangement parameters includes:
converting a fixed pixel coordinate to a logical pixel coordinate corresponding to the current screen display mode; and calculating the coordinate for each sub-pixel based on the logical pixel coordinate;
an image arrangement unit configured to rearrange the 3D image to be displayed to obtain a revised 3D image based on the adjusted 3D image arrangement parameters; and
a display unit configured to display the revised 3D image in the current screen display mode of the handheld terminal.

11. The handheld terminal of claim 10, wherein: the 3D image arrangement parameters further include a tilting angle and a period of a light splitting component coupled to a display screen of the handheld terminal for effecting 3D display; and to determine the 3D image arrangement parameters based on the current screen display mode, the image arrangement parameter determination unit is further configured to: determine a current tilting angle of the light splitting component based on the tilting angle of the light splitting component prior to the horizontal-vertical screen display mode change and a rotation angle of the horizontal-vertical screen display mode change; and determine a current period of the light splitting component based on the period of the light splitting component prior to the horizontal-vertical screen display mode change and the rotation angle of the horizontal-vertical screen display mode change.

12. The handheld terminal of claim 10, wherein: the 3D image arrangement parameters further include a direction and a sequence of the sub-pixel alignment in each pixel; and to calculate the coordinate of each sub-pixel, the image arrangement parameter determination unit is further configured to determine the coordinate of each sub-pixel in the current sub-pixel alignment based on the logical pixel coordinate and the direction of the sub-pixel alignment.

13. The handheld terminal of claim 12, wherein the image arrangement unit is further configured to:
align three sub-pixels of each pixel in the horizontal direction when the current screen display mode is the vertical mode;
assign the coordinate of the first sub-pixel in the pixel as the x-axis value of the logical pixel coordinate minus one third of the pixel pitch;
assign the coordinate of the second sub-pixel in the pixel as the x-axis value of the logical pixel coordinate; and
assign the coordinate of the third sub-pixel in the pixel as the x-axis value of the logical pixel coordinate plus one third of the pixel pitch.

14. The handheld terminal of claim 12, wherein the image arrangement unit is further configured to:
align three sub-pixels of each pixel in the vertical direction when the current screen display mode is the horizontal mode;
assign the coordinate of the first sub-pixel in the pixel as the y-axis value of the logical pixel coordinate plus one third of the pixel pitch;
assign the coordinate of the second sub-pixel in the pixel as the y-axis value of the logical pixel coordinate; and
assign the coordinate of the third sub-pixel in the pixel as the y-axis value of the logical pixel coordinate minus one third of the pixel pitch.

15. The handheld terminal of claim 10, wherein the image arrangement unit is further configured to:
when the handheld terminal triggers the horizontal-vertical screen display mode change, apply parallax compensation to the 3D image to be displayed.

16. The handheld terminal of claim 15, wherein the image arrangement unit is further configured to:

enlarge the parallax of the 3D image to be displayed when the original size of the 3D image to be displayed is smaller than the display size on the handheld terminal in the horizontal mode; and shrink the parallax of the 3D image to be displayed when the original size of the 3D image to be displayed is larger than the display size on the handheld terminal in the vertical mode.

17. The handheld terminal of claim 15, wherein:

an adjustment of the parallax compensation is derived from equation $$\Delta = f\left(1 - \frac{S_{dis}}{S_{ori}}\right) S_{ori},$$

wherein, $S_{ori}$ is an original size of the 3D image, $S_{dis}$ is a display size of the 3D image, and f( ) is a polynomial function; and the polynomial function is $(x) = ax^{-2} + bx^{-1} + cx + dx^2 + e$, wherein, the coefficients a, b, c, d, and e are empirical values.

18. A mobile handheld terminal, comprising:

a display screen configured to display 3D image;

a processor configured to execute instruction code;

a memory configured to store executable instruction code; and a system bus configured to connect the display screen and the memory to the processor, wherein the processor is configured to:

detect a current screen display mode to determine whether the handheld terminal triggers a horizontal-vertical screen display mode change;

determine the current screen display mode as a horizontal mode or a vertical mode when the handheld terminal triggers a horizontal-vertical screen display mode change;

determine 3D image arrangement parameters based on the current screen display mode, wherein:

the 3D image arrangement parameters include pixel information having coordinates of a plurality of sub-pixels of a pixel; and determining the 3D image arrangement parameters includes:

converting a fixed pixel coordinate to a logical pixel coordinate corresponding to the current screen display mode; and calculating the coordinate for each sub-pixel based on the logical pixel coordinate;

rearrange the 3D image to be displayed to obtain a revised 3D image based on the adjusted 3D image arrangement parameters; and display the revised 3D image in the current screen display mode of the handheld terminal.

* * * * *